US012735182B2

(12) United States Patent
Vogel et al.

(10) Patent No.: US 12,735,182 B2
(45) Date of Patent: Sep. 15, 2026

(54) APPARATUS FOR CONNECTION TO AN ANCHOR TRACK OR AN ANCHOR POINT IN AN AIRCRAFT

(71) Applicant: AIRBUS HELICOPTERS DEUTSCHLAND GMBH, Donauwörth (DE)

(72) Inventors: Dominik Vogel, Langweid (DE); Alexandru Dinca, Donauwörth (DE); Juergen Loi, Rain (DE); Christoph Heider, Rain am Lech (DE); Stefan Salzburger, Augsburg (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 33 days.

(21) Appl. No.: 18/657,126

(22) Filed: May 7, 2024

(65) Prior Publication Data

US 2025/0083819 A1 Mar. 13, 2025

(30) Foreign Application Priority Data

Sep. 11, 2023 (EP) .................................... 23196623

(51) Int. Cl.
*F16M 13/00* (2006.01)
*B64D 9/00* (2006.01)

(52) U.S. Cl.
CPC .................................... *B64D 9/00* (2013.01)

(58) Field of Classification Search
CPC ......... B64D 9/00; B64D 11/0696; B64C 1/18; B64C 1/20
See application file for complete search history.

(56) References Cited

U.S. PATENT DOCUMENTS 3,282,229 A * 11/1966 Elsner .................... B64D 9/003 D8/383
4,630,982 A * 12/1986 Fenner ................ B61D 45/001 403/381
6,902,365 B1 * 6/2005 Dowty .............. B64D 11/0696 244/118.6
2010/0314495 A1 12/2010 Dazet et al.
2011/0315731 A1 12/2011 Takemura et al.
(Continued)

FOREIGN PATENT DOCUMENTS

CN 102414046 A 4/2012
EP 2426009 A1 3/2012
(Continued)

OTHER PUBLICATIONS

European Search Report for European Application No. EP 23196623.5, Completed by the European Patent Office, Dated Feb. 14, 2024, 7 pages.

*Primary Examiner* — Amy J. Sterling
(74) *Attorney, Agent, or Firm* — BROOKS KUSHMAN P.C.

(57) ABSTRACT

An apparatus for connection to an anchor track or an anchor point in an aircraft, comprising a main body, a quick fastening device that is attached to the main body and configured for being removably fastened to the anchor track or the anchor point, and at least a first connecting element and a second connecting element which are attached to the main body and configured for being connected to external load connecting devices.

20 Claims, 6 Drawing Sheets

(56) References Cited

U.S. PATENT DOCUMENTS

| | | | | |
|---|---|---|---|---|
| 2018/0111687 | A1* | 4/2018 | Thomas | B64D 1/22 |
| 2021/0380258 | A1* | 12/2021 | Elliott | A61G 3/0808 |
| 2023/0010694 | A1 | 1/2023 | Wiles et al. | |
| 2023/0159168 | A1 | 5/2023 | Vogel et al. | |

FOREIGN PATENT DOCUMENTS

| | | | |
|---|---|---|---|
| EP | 2607162 | A2 | 6/2013 |
| EP | 2607162 | A3 | 2/2018 |
| WO | 2009106746 | A1 | 9/2009 |

* cited by examiner 100
110
112
113
114
115
120
125
127
130
140
145
150
160
170
180

APPARATUS FOR CONNECTION TO AN ANCHOR TRACK OR AN ANCHOR POINT IN AN AIRCRAFT

CROSS-REFERENCE TO RELATED APPLICATIONS

This application claims priority to European patent application No. EP 23196623.5 filed on Sep. 11, 2023, the disclosure of which is incorporated in its entirety by reference herein.

TECHNICAL FIELD

The present disclosure relates to an apparatus for connection to an anchor track or an anchor point in an aircraft.

BACKGROUND

In general, an aircraft may be provided with anchor tracks and/or anchor points which may be used for fixation of seats or other equipment. Accordingly, anchor tracks and/or anchor points may be provided in an aircraft either on a floor, on side walls and/or on a ceiling of an aircraft cabin.

Nowadays, respective anchor tracks and anchor points for aircrafts exist as standardized components which comply with the international standard AS33601A "Track and Stud Fitting for Cargo Transport Aircraft, Standard Dimensions for", set forth by SAE International. More particularly, the standard AS33601A is a quality standard which defines on the one hand side standardized shapes and dimensions of anchor tracks and anchor points, and on the other hand standardized characteristics of associated fastening devices, i.e., stud fittings, which may be mounted removably to the anchor tracks and anchor points.

More specifically, such anchor tracks are usually implemented as longitudinal rails having a rectangular profile that is opened by a longitudinal slot with a series of longitudinal grooves and circular apertures. The circular holes are formed with a diameter that is greater than a respective width of the longitudinal grooves and they are regularly spaced apart from each other along the anchor tracks, respectively at a distance of 25.4 mm, i.e., 1 inch.

Similar to such anchor tracks, anchor points are formed with a rectangular profile that is opened by a longitudinal slot having a series of longitudinal grooves and circular apertures. However, in contrast to anchor tracks the anchor points are only provided with a restricted number of circular holes, e.g., two circular holes.

A fastening device which may be mounted to an aforementioned anchor track or anchor point is usually equipped with at least one cylindrical tenon that extends below a support onto which a suitable clamping counterpart is mounted for clamping the anchor track or anchor point between the cylindrical tenon(s) and the suitable clamping counterpart using e.g., a clamping spring mechanism or a clamping screw. Currently available fastening devices with a single tenon are generally referred to as single stud fittings and fastening devices with two tenons are generally referred to as double stud fittings.

By way of example, the documents EP 2 607 162 A2, WO 2009/106746 A1, and U.S. Pat. No. 3,282,229 A describe anchor tracks and/or anchor points in accordance with the above-described configurations, as well as associated fastening devices. The document EP 2 426 009 A1, in turn, describes an anchor track with an alternative configuration, as well as associated fastening devices.

The document US2023010694 describes a quick-release fitting to be coupled with from a track via a lock mechanism. The quick-release fitting has a first and a second plates, and a linkage mechanism configured so that links are approximately vertical when a blade is in a lowered position. Each of the first plate and the second plate have an upper region and a lower region. The upper regions include upper flanges with apertures configured to receive fasteners for connecting to e.g. seat legs or other structures.

The documents U.S. Pat. No. 6,902,365, EP2607162, US2023159168 and CN102414046 were also cited.

However, conventional fastening devices such as single or double stud fittings are generally implementing single attachment points which enforce a one-to-one usage when lashing equipment or cargo, such as backpacks or heavier items. For instance, when using a conventional double stud fitting with an associated connecting ring, it is excluded to attach more than one belt to the connecting ring, such that a single attachment point is formed, and it is only possible to pull in a single direction.

In other words, the single attachment point is adapted for a single lashing and a single lashing direction. Otherwise severe restrictions of geometrical collision and static dependency of interference with each other may occur. Thus, it must be guaranteed that sufficient free places on an anchor track or sufficient free anchor points are always provided in an aircraft for transportation purposes.

Furthermore, when using e.g., a conventional double stud fitting with one connecting ring, the latter is usually positioned at a low angle or in parallel to the cabin floor in the aircraft, if the respective anchor track or anchor point is provided on the cabin floor. Thus, a separate connector attached to the connecting ring, e.g., a snap hook or carabiner, may repeatedly collide with the cabin floor, in particular in operation of the aircraft. This may, however, result in an abrasive effect on the cabin floor as well as on the carabiner or snap hook.

Based on the limitations and drawbacks of the prior art, it is an object of the present disclosure to provide a new apparatus for connection to an anchor track or an anchor point in an aircraft. This object is solved by an apparatus with the features of claim 1.

More specifically, an apparatus for connection to an anchor track or an anchor point in an aircraft is provided. The apparatus comprises a main body, a quick fastening device that is attached to the main body and configured for being removably fastened to the anchor track or the anchor point, and at least a first connecting element and a second connecting element which are attached to the main body and configured for being connected to external load connecting devices.

Advantageously, the inventive apparatus is usable with conventional standardized anchor tracks and/or anchor points which may e.g., be installed in an aircraft either on a floor, on side walls and/or on a ceiling of an aircraft cabin, or e.g., in a similar manner in any other vehicle. In particular, such conventional standardized anchor tracks and/or anchor points may comply with existing standards such as the international standard AS33601A "Track and Stud Fitting for Cargo Transport Aircraft, Standard Dimensions for", set forth by SAE International. Thus, the inventive apparatus is usable in all rotary wing aircrafts and airplanes and, more generally, in all vehicles which are equipped with such conventional standardized anchor tracks and/or anchor points.

In general, the inventive apparatus may be provided with a standardized component for connection to an anchor track or anchor point, in particular a quick fastening device such as e.g., a double stud fitting that complies with the international standard AS33601A "Track and Stud Fitting for Cargo Transport Aircraft, Standard Dimensions for", set forth by SAE International. This standardized component may be embedded into a main body serving as support for a predetermined number of connecting elements, in particular connection rings, pointing e.g., in a star-shaped manner into different directions. An underlying number, orientation and optional relatability of a respectively realized system of connection rings is customizable.

SUMMARY

Advantageously, the inventive apparatus allows multiplication of a single attachment point into a predetermined number of attachment points such that associated lashing possibilities are extended and usable e.g., for securing persons, human external cargo connections, cargo, and so on. Furthermore, due to multiplication of the attachment points, more human external cargo applications due to increased redundancy are possible. In particular, compared to existing products available on the market attaching of loads in different directions on one attachment point on an anchor track or anchor point is now possible by using the inventive apparatus. Furthermore, there is no risk of collision of external load connecting devices e.g., with a cabin floor when the external load connecting devices are oriented in parallel to the cabin floor, due to an increase of the height achieved by means of the inventive apparatus. In fact, the configuration and shaping of the inventive apparatus may be adapted in such a way that additional moments due to the increased height of each attachment point, i.e., connecting element, are minimized or can be reduced down to zero, if necessary in an underlying application scenario.

In some embodiments, the main body comprises an accommodation and the quick fastening device is arranged in the accommodation.

The quick fastening device may comprise manually activatable clamping means which are configured for being securely clamped at the anchor track or the anchor point.

Preferably, the main body is ring-shaped and comprises at least a first mounting interface and a second mounting interface for attachment of the first connecting element and the second connecting element.

Preferably, the first connecting element and the second connecting element are attached to the main body in an inclined position with a predetermined inclination angle relative to the anchor track or the anchor point such that external load connecting devices are attachable to the first connecting element and the second connecting element at a predetermined height above the anchor track or the anchor point.

Each one of the first connecting element and the second connecting element may comprise a lug or an eyelet.

Preferably, each one of the first connecting element and the second connecting element is rotatable on the main body.

In some embodiments, the main body comprises a support base and a rotatable body that is rotatably connected to the support base. Thus, the quick fastening device may be attached to the support base, and the first connecting element and the second connecting element may be attached to the rotatable body.

The rotatable body may be secured to the support base by means of a cover that is securely attached to the support base via associated cover fixation means.

Alternatively, or in addition, the rotatable body may be secured to the support base by means of a conical connection interface formed between the rotatable body and the support base.

In some embodiments, the apparatus comprises a connecting rail configured for being connected to external load connecting devices. The connecting rail may be provided in addition to, or instead of, the first connecting element and the second connecting element.

The connecting rail may be mounted to the main body via vertically extending mounting pillars.

The vertically extending mounting pillars may be adapted for being connected to external load connecting devices.

Alternatively, the connecting rail may be mounted to the main body via laterally extending mounting rods.

The laterally extending mounting rods may be inclined relative to a radial direction of the main body.

BRIEF DESCRIPTION OF THE DRAWINGS

Preferred embodiments of the present disclosure are outlined by way of example in the following description with reference to the attached drawings. In these attached drawings, identical or identically functioning components and elements are labeled with identical reference signs and characters and are, consequently, only described once in the following description;

FIG. 2 shows a perspective view of a section of the cabin floor of FIG. 1 with anchor tracks and anchor points;

DETAILED DESCRIPTION

Figure 1:
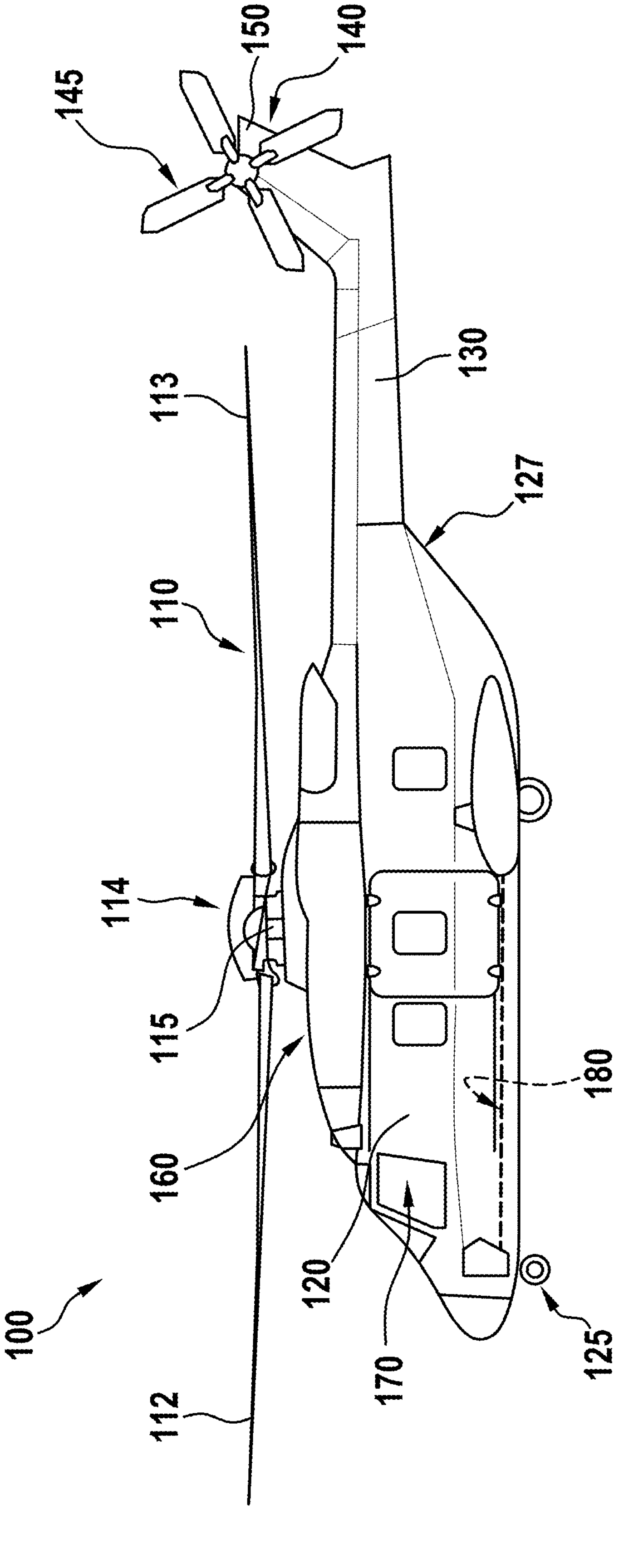
FIG. 1 shows a side view of an illustrative aircraft with a cabin floor.

FIG. 1 shows an aircraft 100 that is illustratively embodied as a rotorcraft and, more particularly, as a helicopter. Thus, for purposes of simplicity and clarity, the aircraft 100 is hereinafter referred to as the "helicopter 100".

Illustratively, the helicopter 100 comprises at least one rotor system 110 that may be embodied as a multi-blade rotor system for providing lift and forward or backward thrust during operation. The at least one rotor system 110 comprises a plurality of rotor blades 112, 113 and may be powered by at least one engine. By way of example, the plurality of rotor blades 112, 113 are mounted at an associated rotor head 114 to a rotor shaft 115, which rotates in operation of the helicopter 100 around an associated rotation axis.

The helicopter 100 illustratively further comprises a fuselage 120 that forms an airframe of the helicopter 100. By way of example, the fuselage 120 is connected to a wheel-type landing gear 125 and illustratively forms a rear fuselage 127. The rear fuselage 127 may be connected to a tail boom 130.

The tail boom 130 may be provided with at least one counter-torque device 140 configured to provide counter-torque during operation, i.e., to counter the torque created by rotation of the plurality of rotor blades 112, 113 around the rotor shaft 115, for purposes of balancing the helicopter 100 in terms of yaw. If desired, the counter-torque device 140 may be shrouded.

Illustratively, the at least one counter-torque device 140 is provided at an aft section of the tail boom 130 and may have a tail rotor 145. The aft section of the tail boom 130 may include a fin 150.

Moreover, the helicopter 100 may comprise a carrier element 160 which may at least cover the at least one engine of the helicopter 100. If desired, the carrier element 160 may further cover a transmission system of the helicopter 100, which may include a gear box, and/or a crest of the helicopter 100. More specifically, the carrier element 160 may be embodied as a cowling arranged on top of the fuselage 120 of the helicopter 100.

Furthermore, the fuselage 120 illustratively forms a cabin 170 e.g., for passengers, equipment, and/or cargo. At least the cabin 170 is provided with an associated cabin floor 180.

Figure 2:
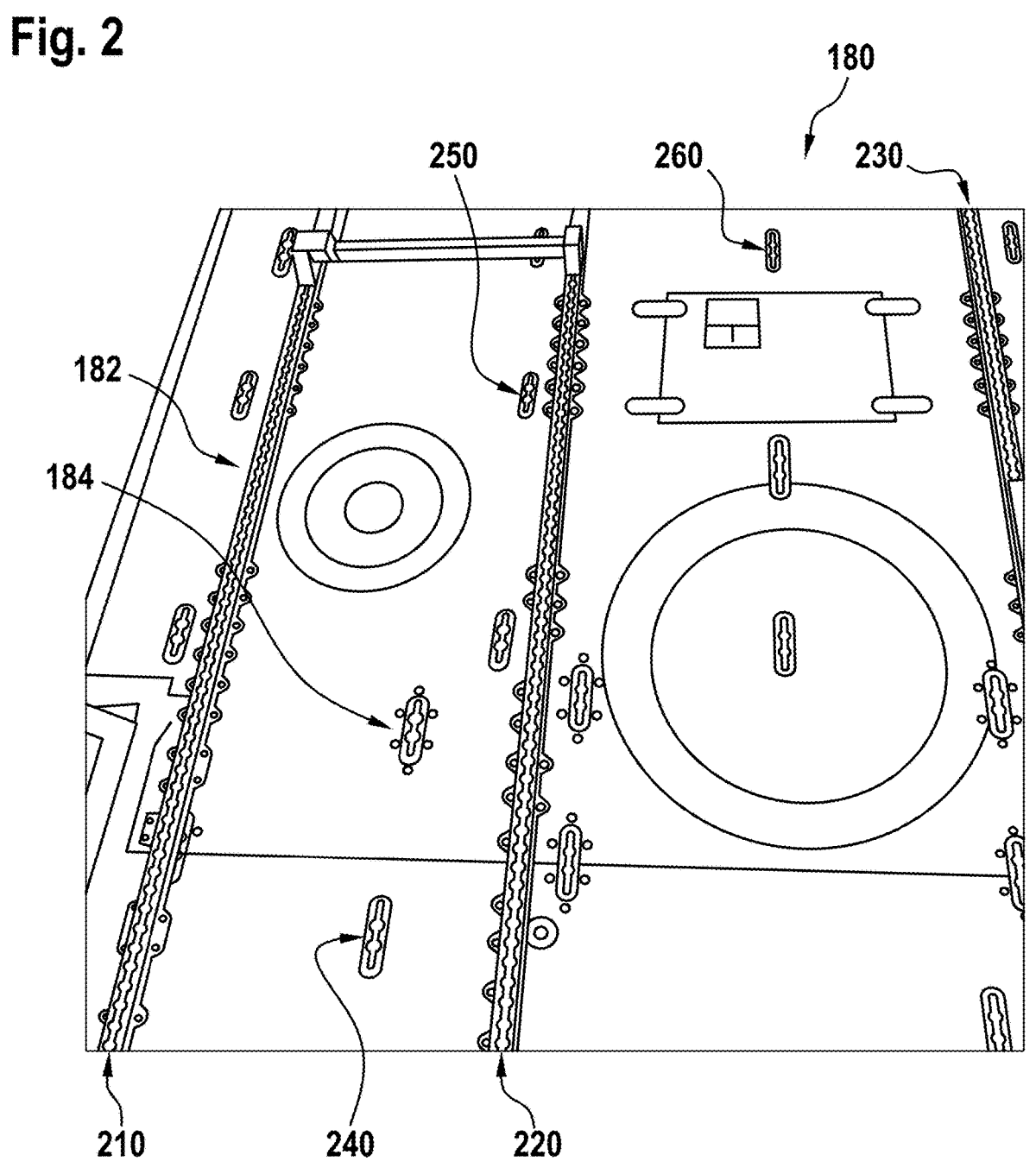

FIG. 2 shows a section of the cabin floor 180 of the helicopter 1 of FIG. 1. Illustratively, the cabin floor 180 is provided with a predetermined number of anchor tracks 182 and/or anchor points 184. The predetermined number of anchor tracks 182 and/or anchor points 184 may be embedded into the cabin floor 180 or mounted on top of the cabin floor 180.

By way of example, the predetermined number of anchor tracks 182 comprises three separate anchor tracks 210, 220, 230, which may also be referred to as "anchor rails" or "seat rails". The anchor tracks 210, 220, 230 preferably comply with the international standard AS33601A "Track and Stud Fitting for Cargo Transport Aircraft, Standard Dimensions for", set forth by SAE International. Illustratively, each one of the anchor tracks 210, 220, 230 is adapted to provide at least a plurality of attachment points on the cabin floor 180.

Likewise, the predetermined number of anchor points 184 comprises a plurality of separate anchor points from which only three anchor points are individually labelled with the reference signs 240, 250, 260, for simplicity and clarity of the drawing. The anchor points 240, 250, 260 may also be referred to as "anchor inserts". The anchor points 240, 250, 260 preferably comply with the international standard AS33601A "Track and Stud Fitting for Cargo Transport Aircraft, Standard Dimensions for", set forth by SAE International. Illustratively, each one of the anchor points 240, 250, 260 is adapted to provide at least a single attachment point on the cabin floor 180.

At this point, it should be noted that the predetermined number of anchor tracks 182 and/or anchor points 184 is only by way of example illustrated in connection with the cabin floor 180 in the cabin 170 of the helicopter 100 of FIG. 1, and not for restricting the disclosure accordingly. Instead, respective anchor tracks and/or anchor points may likewise be provided on side walls or on a ceiling of the cabin 170 of the helicopter 100 of FIG. 1.

Furthermore, it should be noted that application of the present disclosure is not limited to the helicopter 100 of FIG. 1. Instead, the present disclosure may be applied in the complete field of aeronautics, i.e., in any type of aircraft and, more generally, in any type of vehicle or even buildings which may make use of the predetermined number of anchor tracks 182 and/or anchor points 184.

Figure 3:
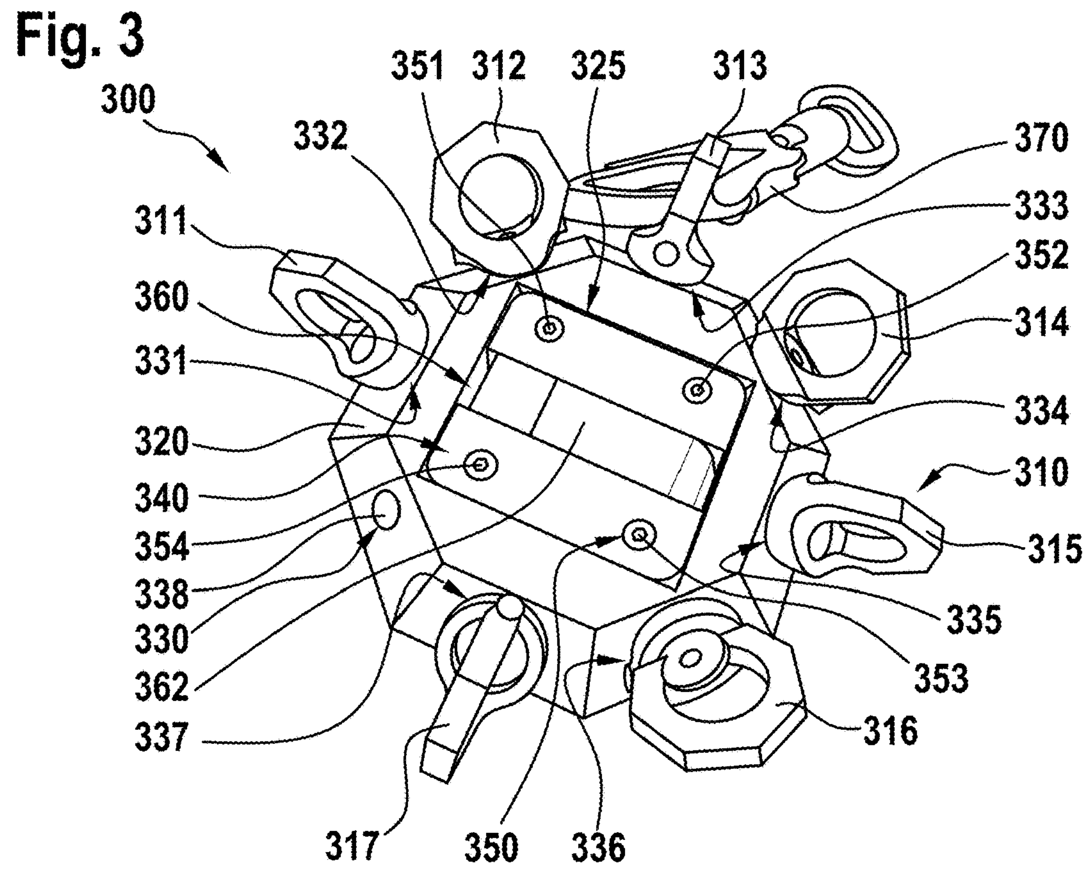
FIG. 3 shows a perspective top view of an illustrative apparatus for connection to an anchor track or an anchor point of FIG. 2.

FIG. 3 shows an apparatus 300 for connection to an anchor track or an anchor point in an aircraft according to the present disclosure. By way of example, the apparatus 300 may be adapted for connection to one of the predetermined number of anchor tracks 182 of FIG. 2, or one of the predetermined number of anchor points 184 of FIG. 2, in the helicopter 100 of FIG. 1.

The apparatus 300 comprises at least a main body 320, a quick fastening device 340, and at least two connecting elements. Illustratively, a plurality of connecting elements 310 is provided. By way of example, the plurality of connecting elements 310 comprises seven connecting elements 311, 312, 313, 314, 315, 316, 317.

At least a first connecting element and a second connecting element and, illustratively, each one of the plurality of connecting elements 310 is preferably attached to the main body 320 and configured for being connected to external load connecting devices, such as carabiners or snap hooks which are e.g., connected to load securing belts or nets. By way of example, an external load connecting device 370, which is embodied as a snap hook, is connected to the connecting element 313.

Preferably, at least one and, preferentially, each one of the plurality of connecting elements 310 is attached to the main body 320 in an inclined position with a predetermined inclination angle (530 in FIG. 5) relative to an anchor track or an anchor point to which the apparatus 300 is removably fastened. Thus, a respective external load connecting device is attachable to an associated one of the plurality of connecting elements 310 at a predetermined distance or height (540 in FIG. 5) to/above the anchor track or the anchor point to which the apparatus 300 is removably fastened.

At least one and, illustratively, each one of the plurality of connecting elements 310 may comprise a lug or an eyelet. Furthermore, at least one and, illustratively, each one of the plurality of connecting elements 310 may be rotatable on the main body 320.

The main body 320 may be fastened removably to a given anchor track or anchor point by means of the quick fastening device 340. Therefore, the quick fastening device 340 is attached to the main body 320, e.g., by means of suitable fasteners 350, and configured for being removably fastened to an anchor track or an anchor point. By way of example, the suitable fasteners 350 comprise four screws 351, 352, 353, 354.

More specifically, the quick fastening device 340 may comprise manually activatable clamping means 360 which are configured for being securely clamped at an anchor track or an anchor point, e.g., using a suitable clamping lever 362. The quick fastening device 340 is described in more detail below at FIG. 4.

Preferably, the quick fastening device 340 is arranged in an accommodation 325 formed in the main body 320. For instance, the main body 320 may be ring-shaped and form a ring around the accommodation 325. Illustratively, the ring-shaped main body 320 comprises at least one mounting interface for attachment of at least one connecting element of the plurality of connecting elements 310. Preferably, a plurality of mounting interfaces 330 is provided which illustratively comprises seven mounting interfaces 331, 332, 333, 334, 335, 336, 337, one for each one of the plurality of connecting elements 310, i.e., one for each one of the connecting elements 311, 312, 313, 314, 315, 316, 317.

Furthermore, an eighth mounting interface 338 is shown for attachment of an eighth connecting element. However, illustration of the eighth connecting element is omitted to further illustrate the implementation of the eighth mounting interface 338 and, thus, a possible implementation of each one of the mounting interfaces 331, 332, 333, 334, 335, 336, 337.

Figure 4:
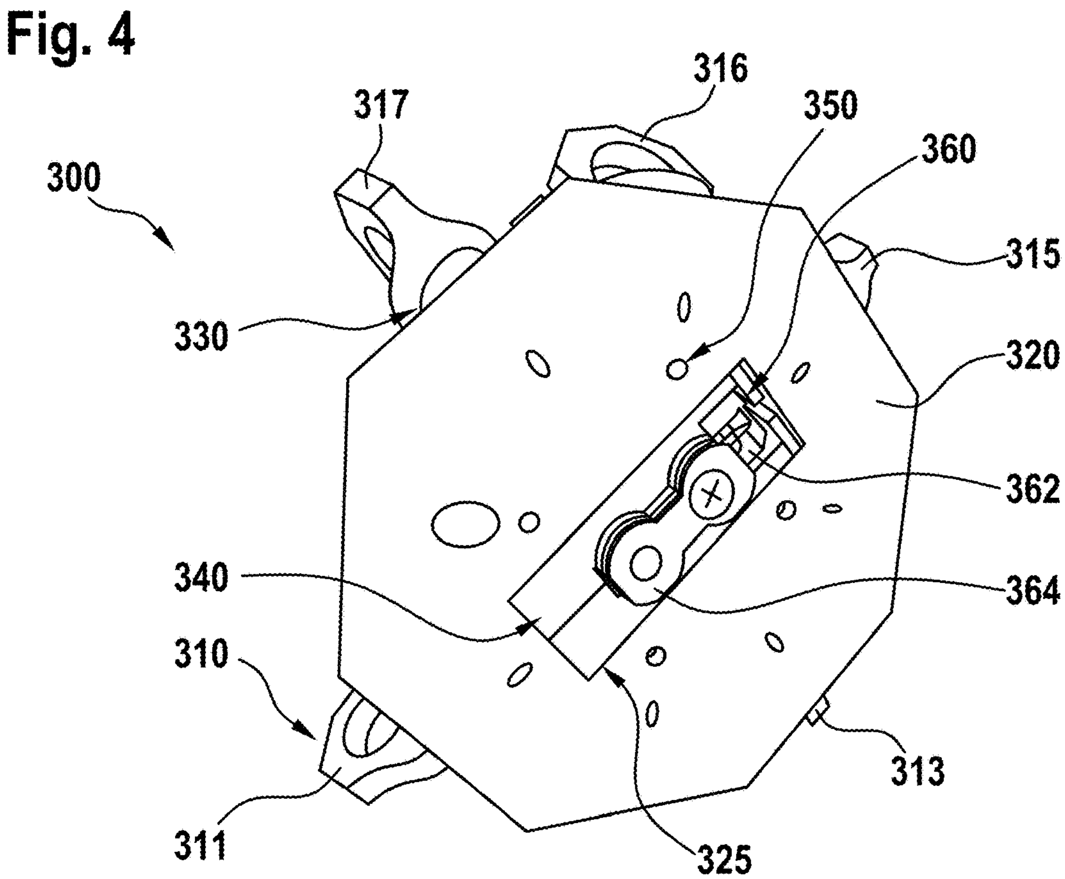
FIG. 4 shows a perspective bottom view of the apparatus of FIG. 3.

FIG. 4 shows the apparatus 300 of FIG. 3 with the main body 320, the quick fastening device 340 which is attached to the main body 320 via the suitable fasteners 350, and the plurality of connecting elements 310 that is attached to the main body 320 via the plurality of mounting interfaces 330. According to FIG. 3, the quick fastening device 340 comprises the manually activatable clamping means 360 with the clamping lever 362.

FIG. 4 further illustrates the quick fastening device 340 that may advantageously be implemented by any suitable conventional quick fastening device which may be fastened removably to an anchor track or an anchor point. Illustratively, the quick fastening device 340 is provided with a double stud fitting configuration, i.e., with a clampable double stud fitting 364 that interacts with the clamping lever 362.

Preferably, the quick fastening device 340 complies with the international standard AS33601A "Track and Stud Fitting for Cargo Transport Aircraft, Standard Dimensions for", set forth by SAE International. Only by way of example, and not for limiting the disclosure accordingly, the quick fastening device 340 may be implemented by a QCTL® (Quick Change Track Lock) Type BP-104/80D-501 manufactured by Verbindungs-Techniken-Rüther, Tackweg 41, D-47918 Tönisvorst. Thus, a more detailed description of the quick fastening device 340 may be omitted, for brevity and conciseness.

Figure 5:
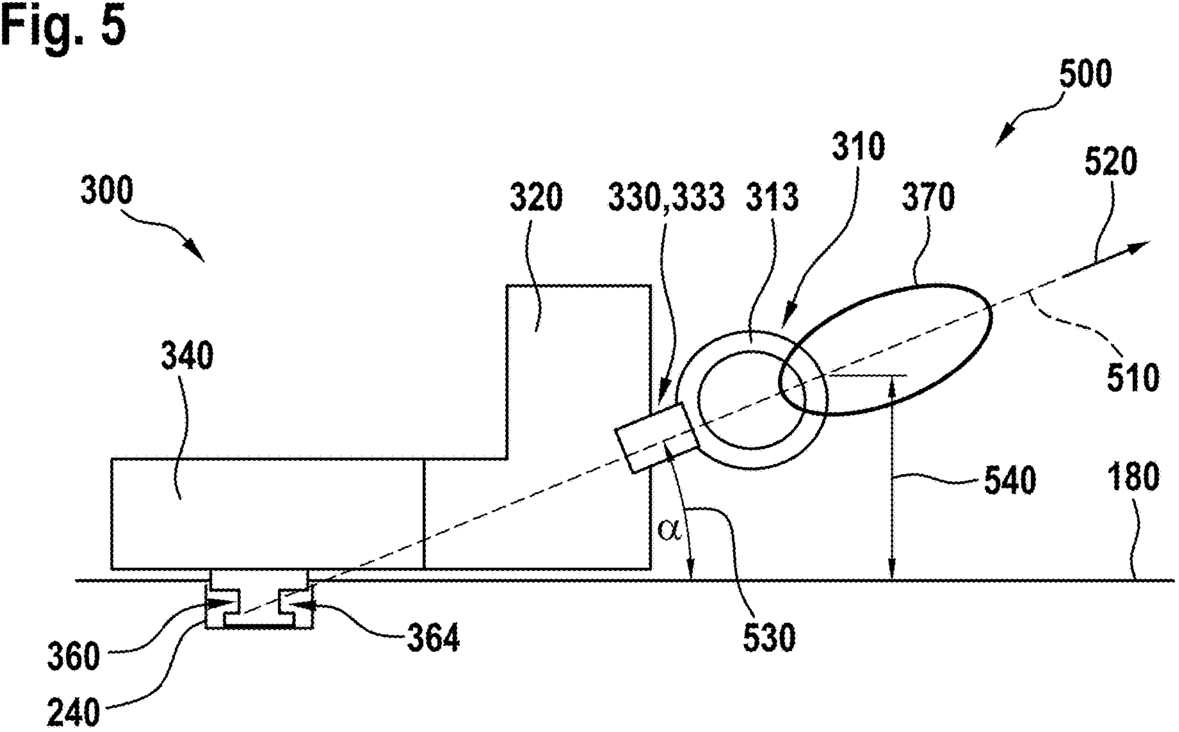
FIG. 5 shows a schematic sectional view of the apparatus of FIG. 3 and FIG. 4.

FIG. 5 shows a functional diagram 500 for further illustrating the functionality of the apparatus 300 of FIG. 3 and FIG. 4. However, for simplicity and clarity of the drawing the functional diagram 500 is only shown with a schematically illustrated section of the apparatus 300.

More specifically, as described above the apparatus 300 comprises the main body 320, the quick fastening device 340 with the manually activatable clamping means 360 that comprises the clampable double stud fitting 364, and the plurality of connecting elements 310 that is attached to the main body 320 via the plurality of mounting interfaces 330. However, in the functional diagram 500 only the connecting element 313 of the plurality of connecting elements 310 is visible and attached to the main body 320 via the mounting interface 333 of the plurality of mounting interfaces 330. In accordance with FIG. 3, the external load connecting device 370 is connected to the connecting element 313.

By way of example, the apparatus 300 is removably fastened to the anchor point 240 provided in the cabin floor 180 of FIG. 2 by means of the quick fastening device 340 and, more particularly, by means of the clampable double stud fitting 364 of the manually activatable clamping means 360. Illustratively, the clampable double stud fitting 364 forms a force line 510 with the mounting interface 333 and the connecting element 313. The force line 510 preferably defines a direction of a tensile force 520 that may be applied by means of the external load connecting device 370 to the connecting element 313.

More specifically, the force line 510 preferably forms a predetermined inclination angle 530 relative to an underside of the main body 320, i.e., relative to the cabin floor 180. Thus, the connecting element 313 is preferably attached to the main body 320 in an inclined position with the predetermined inclination angle 530 relative to the clampable double stud fitting 364, i.e., the anchor point 240, such that the external load connecting device 370 is attached to the connecting element 313 at a predetermined height 540 above the anchor point 240, i.e., above the cabin floor 180. Thus, any risk of collision of the external load connecting device 370 with the cabin floor 180 may advantageously be avoided such that undesired abrasion or wear of the cabin floor 180 may be omitted.

Figure 6:
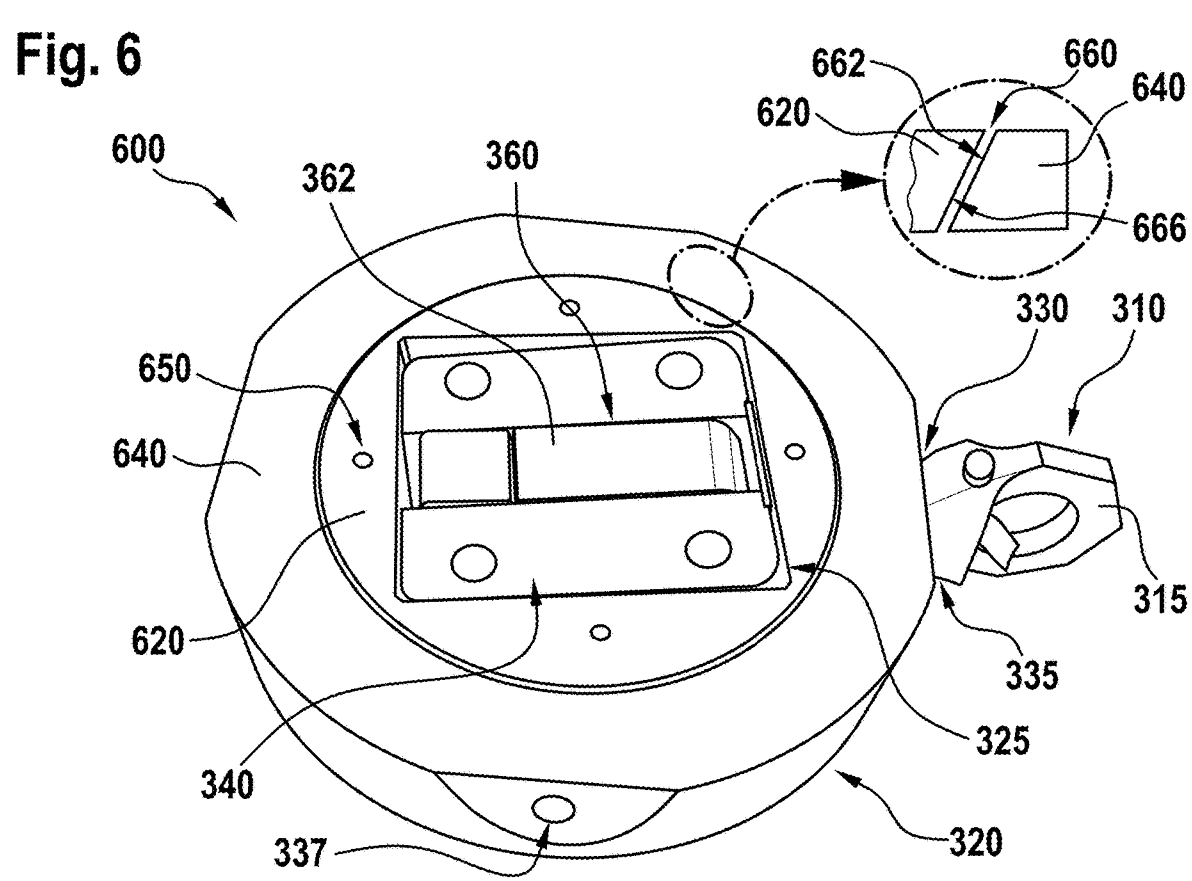
FIG. 6 shows a perspective top view of an illustrative apparatus for connection to an anchor track or an anchor point of FIG. 2 according to a first variant.

FIG. 6 shows an apparatus 600 for connection to an anchor track or an anchor point in an aircraft according to the present disclosure. By way of example, the apparatus 600 may be adapted for connection to one of the predetermined number of anchor tracks 182 of FIG. 2, or one of the predetermined number of anchor points 184 of FIG. 2, in the helicopter 100 of FIG. 1.

In accordance with the apparatus 300 of FIG. 3 to FIG. 5, the apparatus 600 comprises the main body 320, the quick fastening device 340 that comprises the manually activatable clamping means 360 with the clamping lever 362, and the plurality of connecting elements 310 that is attached to the main body 320 via the plurality of mounting interfaces 330. Nevertheless, for simplicity and clarity of the drawing only the connecting element 315 of the plurality of connecting elements 310 is visible and attached to the main body 320 via the mounting interface 335 of the plurality of mounting interfaces 330.

However, in contrast to the apparatus 300 of FIG. 3 to FIG. 5 the main body 320 now comprises in the apparatus 600 a support base 620 and a rotatable body 640 that is rotatably connected to the support base 620. Preferably, the quick fastening device 340 is attached to the support base 620, and the plurality of connecting elements 310, i.e., illustratively the connecting element 315, is attached to the rotatable body 640.

More specifically, the rotatable body 640 may be connected to the support base 620 by means of a suitable bearing. By way of example, a ball bearing or a roller bearing may be used to connect the rotatable body 640 rotatably to the support base 620.

The rotatable body 640 may e.g., be secured to the support base 620 by means of a cover in order to avoid an undesired lifting of the rotatable body 640 from the support base 620. Such a cover may e.g., be attached securely to the support base 620 via associated cover fixation means 650, for instance, via screwing. Alternatively, the cover may be replaced by a radially extending flange or collar provided on the support base 620, which extends at least partly over the rotatable body 640. However, as illustration of a cover in FIG. 6 would obstruct the view of at least the support base 620 as well as the quick fastening device 340 and as illustration of a collar in FIG. 6 would obstruct the view of at least a part of the rotatable body 640, such illustrations are omitted for simplicity and clarity of the drawing.

In addition to the cover, or alternatively, the rotatable body 640 may be secured to the support base 620 by means of a conical connection interface 660 formed between the rotatable body 640 and the support base 620, as illustrated in an enlarged detail view. More specifically, the conical connection interface 660 may be formed by a conical accommodation 662 of the rotatable body 640 and a corresponding conical outer surface 666 of the support base 620.

Figure 7:
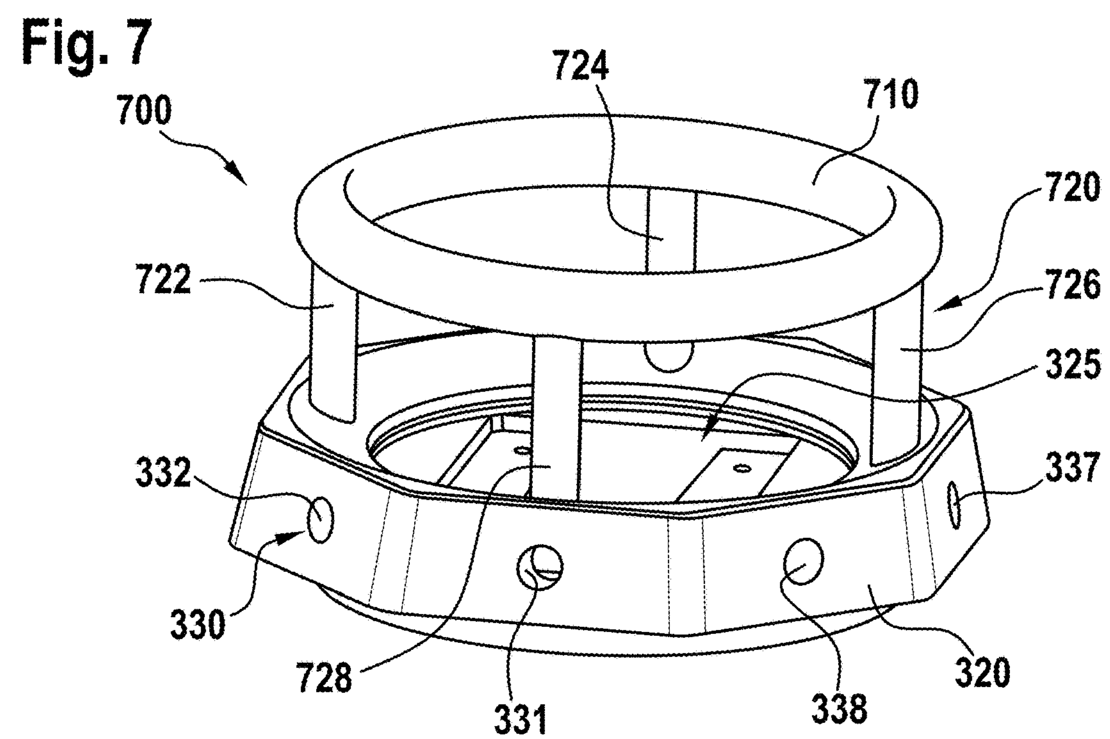
FIG. 7 shows a perspective side view of an illustrative apparatus for connection to an anchor track or an anchor point of FIG. 2 according to a second variant.

FIG. 7 shows an apparatus 700 for connection to an anchor track or an anchor point in an aircraft according to the present disclosure. By way of example, the apparatus 700 may be adapted for connection to one of the predetermined number of anchor tracks 182 of FIG. 2, or one of the predetermined number of anchor points 184 of FIG. 2, in the helicopter 100 of FIG. 1.

In accordance with the apparatus 300 of FIG. 3 to FIG. 5, the apparatus 700 comprises the main body 320 with the accommodation 325, and the plurality of mounting interfaces 330. Nevertheless, for simplicity and clarity of the drawing illustration of the quick fastening device 340 and the plurality of connecting elements 310 that is attached to the main body 320 according to FIG. 3 to FIG. 5 is omitted.

However, in contrast to the apparatus 300 of FIG. 3 to FIG. 5 the apparatus 700 further comprises a connecting rail 710 that is configured for being connected to external load connecting devices such as the external load connecting device 370 of FIG. 3. Illustratively, the connecting rail 710 is mounted in parallel to the main body 320 via a plurality of—in FIG. 7 vertically extending—mounting pillars 720. For instance, the connecting rail 710 has an annular shape and circular cross section. By way of example, the plurality of vertically extending mounting pillars 720 comprises four vertically extending mounting pillars 722, 724, 726, 728. Advantageously, the vertically extending mounting pillars 722, 724, 726, 728 may also be adapted for being connected to external load connecting devices such as the external load connecting device 370 of FIG. 3.

Figure 8:
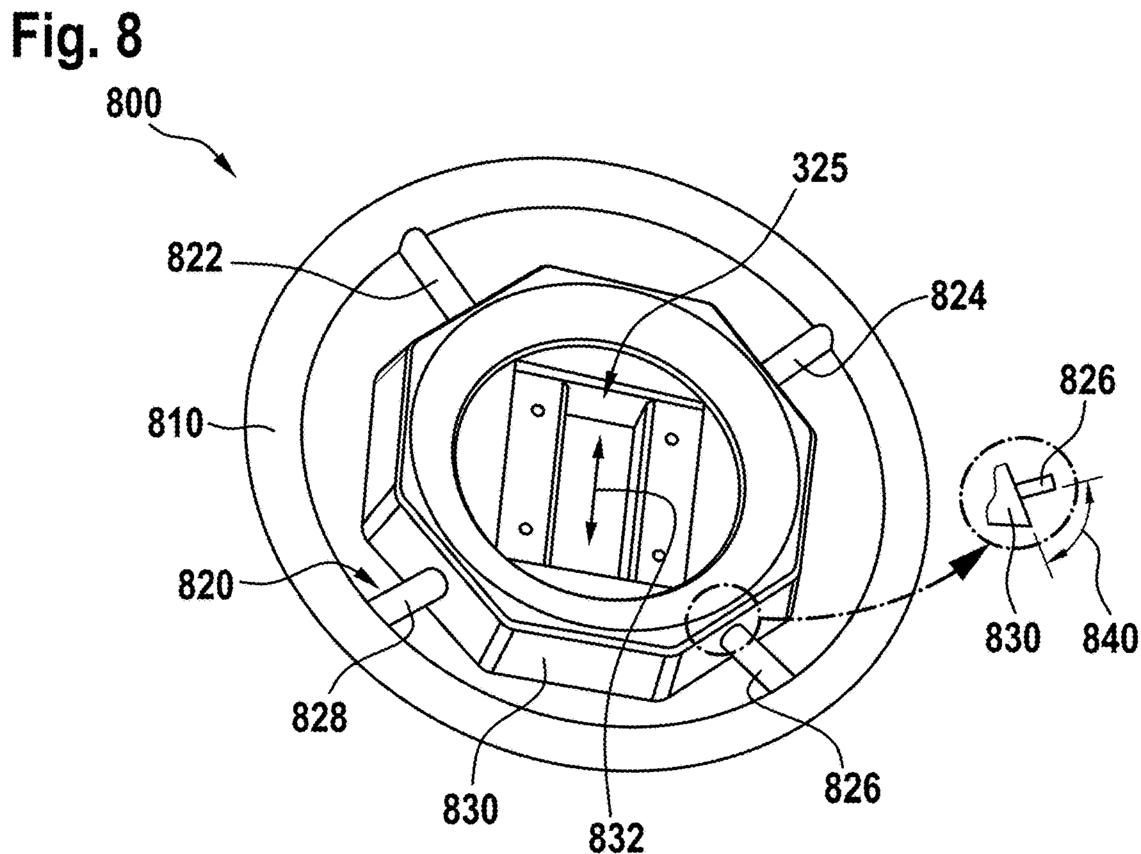
FIG. 8 shows a perspective top view of an illustrative apparatus for connection to an anchor track or an anchor point of FIG. 2 according to a third variant.

FIG. 8 shows an apparatus 800 for connection to an anchor track or an anchor point in an aircraft according to the present disclosure. By way of example, the apparatus 800 may be adapted for connection to one of the predetermined number of anchor tracks 182 of FIG. 2, or one of the predetermined number of anchor points 184 of FIG. 2, in the helicopter 100 of FIG. 1.

Similar to the apparatus 300 of FIG. 3 to FIG. 5, the apparatus 800 comprises a main body 830 which comprises the accommodation 325 for accommodation of the quick fastening device 340. However, in contrast to the main body 320 of FIG. 3 to FIG. 5 the main body 830 of the apparatus 800 is illustratively not provided with the plurality of mounting interfaces 330 and the plurality of connecting elements 310. Instead, the apparatus 800 only comprises a connecting rail 810 that is configured for being connected to external load connecting devices such as the external load connecting device 370 of FIG. 3. For instance, the connecting rail 810 has an annular shape and circular cross section.

The connecting rail 810 is illustratively mounted to the main body 830 via a plurality of laterally extending mounting rods 820. By way of example, the plurality of laterally extending mounting rods 820 comprises four laterally extending mounting rods 822, 824, 826, 828. Advantageously, the laterally extending mounting rods 822, 824, 826, 828 may also be adapted for being connected to external load connecting devices such as the external load connecting device 370 of FIG. 3.

Illustratively, the main body 830 has a radial direction 832. Preferably, the laterally extending mounting rods 822, 824, 826, 828 are inclined relative to the radial direction 832 of the main body 830 by a predetermined inclination angle 840, as illustrated in an additional detail view. The predetermined inclination angle 840 may e.g., range from 0° to 60°.

FIG. 9 to FIG. 12 show different application scenarios which are enabled by use of one or more of the apparatuses of FIG. 3 to FIG. 8. Only by way of example, and not for restricting the disclosure thereto, the different application scenarios are described with reference to use of one or more apparatuses which are realized in accordance with the apparatus 300 of FIG. 3 to FIG. 5.

Figure 9:
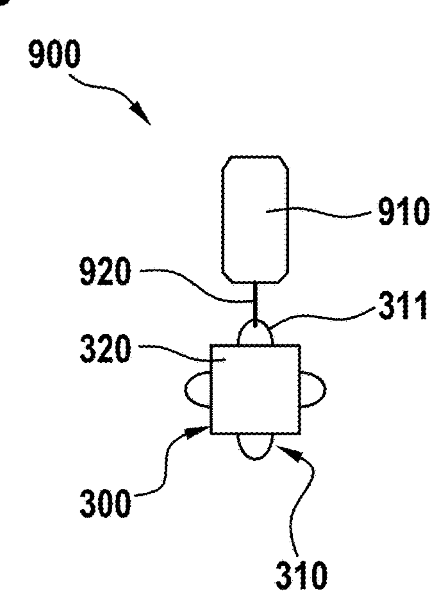
FIG. 9 to FIG. 12 show illustrative application scenarios with one or more of the apparatuses of FIG. 3 to FIG. 8.

FIG. 9 shows a first illustrative application scenario 900 with the apparatus 300 of FIG. 3 to FIG. 5. The apparatus 300 is schematically illustrated in simplified form comprising only the main body 320 and the plurality of connecting elements 310, wherein only four separate connecting elements are shown, and wherein only the connecting element 311 is individually labelled.

By way of example, in the first illustrative application scenario 900 a single load 910 is connected to the connecting element 311 by means of a load attachment 920, which may comprise an external load connecting device, e.g., the external load connecting device 370 of FIG. 3. The load 910 may e.g., be a piece of equipment, a backpack or any other cargo in general.

Figure 10:
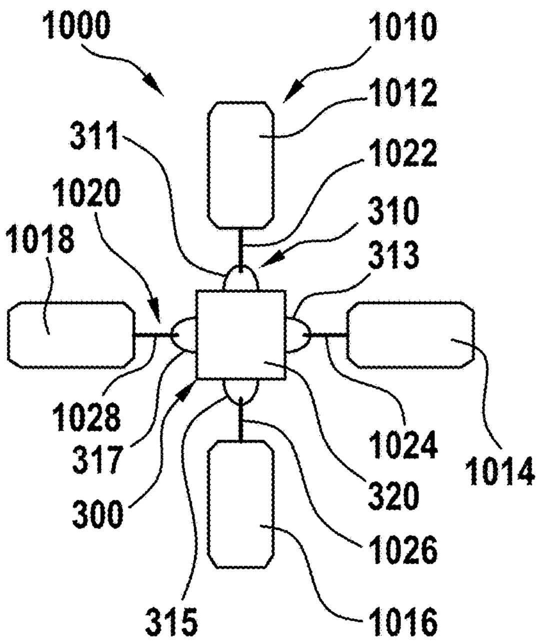

FIG. 10 shows a second illustrative application scenario 1000 with the apparatus 300 of FIG. 3 to FIG. 5. The apparatus 300 is again schematically illustrated in simplified form comprising only the main body 320 and the plurality of connecting elements 310, wherein only the connecting elements 311, 313, 315, 317 are shown and individually labelled.

By way of example, in the second illustrative application scenario 1000 a plurality of loads 1010 is connected to the plurality of connecting elements 310 by means of a plurality of load attachments 1020. Each one of the plurality of loads 1010 may e.g., be a piece of equipment, a backpack or any other cargo in general.

More specifically, a load 1012 is connected to the connecting element 311 by means of a load attachment 1022, a load 1014 is connected to the connecting element 313 by means of a load attachment 1024, a load 1016 is connected to the connecting element 315 by means of a load attachment 1026, and a load 1018 is connected to the connecting element 317 by means of a load attachment 1028. Each one of the load attachments 1022, 1024, 1026, 1028 may comprise an external load connecting device, e.g., the external load connecting device 370 of FIG. 3.

Figure 11:
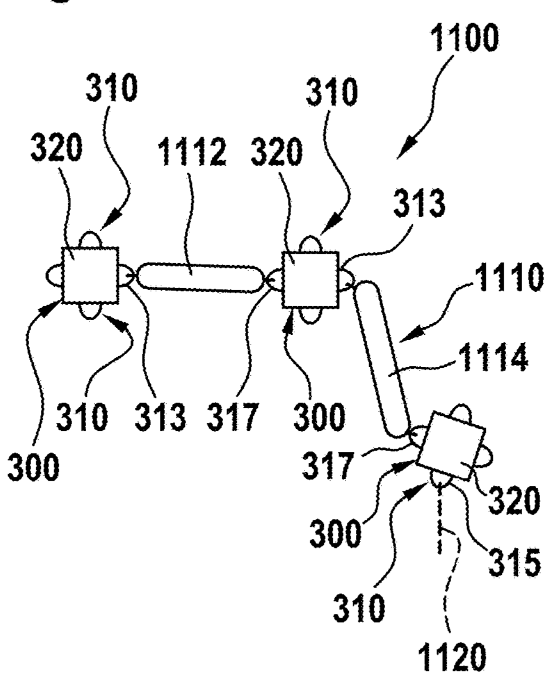

FIG. 11 shows a third illustrative application scenario 1100 with three apparatuses 300 according to FIG. 3 to FIG. 5. The apparatuses 300 are again schematically illustrated in simplified form comprising respectively only the main body 320 and the plurality of connecting elements 310, wherein only the connecting element 313 is individually labelled on the first apparatus 300 (upper left), only the connecting elements 313, 317 are individually labelled on the second apparatus 300 (upper right), and only the connecting elements 315, 317 are individually labelled on the third apparatus 300 (lower right).

By way of example, in the third illustrative application scenario 1100 the different apparatuses 300 are interconnected by means of a plurality of interconnecting means 1110 to form a chain-like arrangement similar to a so-called "daisy chain". In this third illustrative application scenario 1100, the plurality of interconnecting means 1110 may be used for attachment of persons, equipment, or cargo.

More specifically, first interconnecting means 1112 interconnect the connecting elements 313 and 317 of the first and second apparatuses 300, and second interconnecting means 1114 interconnect the connecting elements 313 and 317 of the second and third apparatuses 300. Each one of the first and second interconnecting means 1112, 1114 may e.g., be a belt or a rope. Likewise, additional interconnecting means may be used to include additional apparatuses 300 into the chain-like arrangement, as illustrated with a dotted line 1120 starting from the connecting element 315 of the third apparatus 300.

Figure 12:
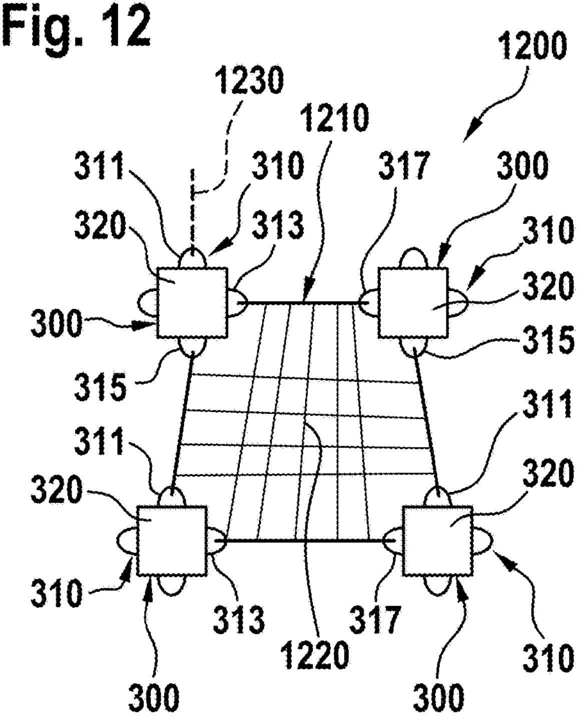

FIG. 12 shows a fourth illustrative application scenario 1200 with four apparatuses 300 according to FIG. 3 to FIG. 5. The apparatuses 300 are again schematically illustrated in simplified form comprising respectively only the main body 320 and the plurality of connecting elements 310, wherein only the connecting elements 311, 313, 315 are individually labelled on the first apparatus 300 (upper left), only the connecting elements 315, 317 are individually labelled on the second apparatus 300 (upper right), only the connecting elements 311, 317 are individually labelled on the third apparatus 300 (lower right), and only the connecting elements 311, 313 are individually labelled on the fourth apparatus 300 (lower left).

By way of example, in the third illustrative application scenario 1200 the different apparatuses 300 are interconnected by means of a plurality of net edges 1210 of a net 1220. In this fourth illustrative application scenario 1200, the net 1220 may be used for securing equipment, backpacks, or cargo. Furthermore, an additional interconnection may be formed as illustrated by way of example with a dotted line 1230 starting from the connecting element 311 of the first apparatus 300.

It should be noted that modifications to the above described embodiments are within the common knowledge of the person skilled in the art and, thus, also considered as being part of the present disclosure. For instance, at FIG. 6 it is described that the rotatable body 640 is rotatably connected to the support base 620. However, the rotatable body 640 and the support base 620 may e.g., be provided with suitable blocking means which enable blocking of the rotatable body 640 on the support base 620 in a fixed position. By way of example, such blocking means may comprise at least one blocking pin that may be introduced through the rotatable body 640 into the support base 620 for blocking the rotatable body 640 on the support base 620 in a fixed position. The at least one blocking pin may e.g., be secured on the rotatable body 640 or the support base 620 by means of a loss prevention cord or chain. Moreover, by providing more than one accommodation for the blocking pin in the rotatable body 640 and the support base 620, different angular positions of the rotatable body 640 relative to the support base 620 may be realized.

Furthermore, in FIG. 7 four vertically extending mounting pillars 722, 724, 726, 728 of equal length are shown and angularly spaced apart from each other respectively with an angle of 90°. However, the number, length, and angular spacing may be adjusted in an application specific manner in a wide range of different applications.

Likewise, in FIG. 8 four radially extending mounting pillars 822, 824, 826, 828 of equal length are shown and angularly spaced apart from each other respectively with an angle of 90°. However, the number, length, and angular spacing may also be adjusted in an application specific manner in a wide range of different applications.

Finally, four different application scenarios are described at FIG. 9 to FIG. 12 by way of example. However, it should be noted that various other application scenarios are likewise contemplated, such as e.g., any possible combination of the four described application scenarios, and so on.

REFERENCE LIST

100 aircraft
110 multi-blade rotor system
112, 113 rotor blades
114 rotor head
115 rotor shaft
120 fuselage
125 wheel-type landing gear
127 rear fuselage
130 tail boom
140 counter-torque device
145 tail rotor
150 fin
160 cowling
170 cabin
180 cabin floor
182 anchor tracks
184 anchor points
210, 220, 230 individual anchor tracks
240, 250, 260 individual anchor points
300 multiple connecting elements apparatus
310 connecting elements
311, 312, 313, 314, 315, 316, 317 individual connecting elements
320 main body
325 accommodation
330 mounting interfaces
331, 332, 333, 334, 335, 336, 337, 338 individual mounting interfaces
340 quick fastening device
350 device fasteners
351, 352, 353, 354 individual device fasteners
360 clamping means
362 clamping lever
364 clampable double stud fitting
370 snap hook
500 functional diagram
510 force line
520 applied force
530 inclination angle
540 predetermined height
600 first alternative multiple connecting elements apparatus
620 support base
640 rotatable body
650 cover fixation means
660 conical connection interface
662 conical accommodation
666 conical outer surface
700 second alternative multiple connecting elements apparatus
710 connecting rail
720 mounting pillars
722, 724, 726, 728 individual mounting pillars
800 third alternative multiple connecting elements apparatus
810 connecting rail
820 mounting rods
822, 824, 826, 828 individual mounting rods
830 main body
840 inclination angle
832 radial direction
900 first application scenario
910 load
920 load attachment
1000 second application scenario
1010 loads
1012, 1014, 1016, 1018 individual loads
1020 load attachments
1022, 1024, 1026, 1028 individual load attachments
1100 third application scenario
1110 interconnecting means
1112, 1114 individual interconnecting means

1120 additional interconnection(s)
1200 fourth application scenario
1210 net edges
1220 net
1230 additional interconnection(s)

What is claimed is:

1. An apparatus for connection to an anchor track or an anchor point in an aircraft, comprising:

a main body;

a quick fastening device that is attached to the main body and configured for being removably fastened to the anchor track or the anchor point; and at least a first connecting element and a second connecting element which are attached to the main body and configured for being connected to external load connecting devices; and wherein the main body comprises a support base and a rotatable body that is rotatably connected to the support base, wherein the quick fastening device is attached to the support base, and wherein the first connecting element and the second connecting element are attached to the rotatable body.

2. The apparatus of claim 1, wherein the main body comprises an accommodation, and wherein the quick fastening device is arranged in the accommodation, and wherein the rotatable body surrounds at least a portion of the support base and is rotatably connected to the support base about a central axis.

3. The apparatus of claim 1, wherein the quick fastening device comprises manually activatable clamping means which are configured for being securely clamped at the anchor track or the anchor point.

4. The apparatus of claim 1, wherein the main body is ring-shaped and comprises at least a first mounting interface and a second mounting interface for attachment of the first connecting element and the second connecting element.

5. The apparatus of claim 1, wherein the first connecting element and the second connecting element are attached to the main body in an inclined position with a predetermined inclination angle relative to the anchor track or the anchor point such that external load connecting devices are attachable to the first connecting element and the second connecting element at a predetermined height above the anchor track or the anchor point.

6. The apparatus of claim 1, wherein each one of the first connecting element and the second connecting element comprises a lug or an eyelet.

7. The apparatus of claim 1, wherein each one of the first connecting element and the second connecting element is rotatable on the main body.

8. The apparatus of claim 1, wherein the rotatable body is secured to the support base by means of a cover that is securely attached to the support base via associated cover fixation means.

9. The apparatus of claim 1, wherein the rotatable body is secured to the support base by means of a conical connection interface formed between the rotatable body and the support base.

10. The apparatus of claim 1, further comprising a connecting rail configured for being connected to external load connecting devices.

11. The apparatus of claim 10, wherein the connecting rail is mounted to the main body via vertically extending mounting pillars.

12. The apparatus of claim 11, wherein the vertically extending mounting pillars are adapted for being connected to external load connecting devices.

13. The apparatus of claim 10, wherein the connecting rail is mounted to the main body via laterally extending mounting rods.

14. The apparatus of claim 13, wherein the laterally extending mounting rods are inclined relative to a radial direction of the main body.

15. An apparatus for connection to an anchor track or an anchor point in an aircraft, the apparatus comprising:

a main body;

a quick fastening device attached to the main body and configured for being removably fastened to the anchor track or the anchor point;

at least a first connecting element and a second connecting element which are attached to the main body and configured for being connected to external load connecting devices; the main body comprising a support base and a rotatable body rotatably connected to the support base about a central axis extending through the support base, wherein the quick fastening device is attached to the support base, and wherein the first connecting element and the second connecting element are attached to the rotatable body; and wherein the rotatable body is secured to the support base by means of a conical connection interface formed between the rotatable body and the support base.

16. An apparatus for connection to an anchor track or an anchor point in an aircraft, the apparatus comprising:

a main body;

a fastening device attached to the main body and configured for being removably fastened to the anchor track or the anchor point; and a first connecting element and a second connecting element attached to the main body and configured for being connected to external load connecting devices; and wherein the main body comprises a support base and a rotatable body rotatably connected to the support base about an axis extending through the support base, the fastening device attached to the support base, and the first connecting element and the second connecting element are attached to the rotatable body, and wherein the first and second connecting elements are radially spaced further from the axis than the support base.

17. The apparatus of claim 16, the rotatable body secured to the support base by a conical connection interface between the rotatable body and the support base.

18. The apparatus of claim 16, wherein the rotatable body is secured to the support base by a connection interface formed between the rotatable body and the support base.

19. The apparatus of claim 16, further comprising a connecting rail configured for being connected to external load connecting devices, wherein the connecting rail is mounted to the main body via mounting rods.

20. The apparatus of claim 16, wherein the rotatable body is rotatable about a central axis relative to the support base when the apparatus is mounted to the anchor track or anchor point.

* * * * *